(12) United States Patent
Zhang et al.

(10) Patent No.: US 12,449,698 B2
(45) Date of Patent: Oct. 21, 2025

(54) BACKLIGHT MODULE AND DISPLAY DEVICE

(71) Applicant: Wuhan China Star Optoelectronics Technology Co., Ltd., Hubei (CN)

(72) Inventors: Shoudong Zhang, Hubei (CN); Suimang Song, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,325

(22) PCT Filed: Dec. 15, 2021

(86) PCT No.: PCT/CN2021/138513
§ 371 (c)(1),
(2) Date: Aug. 28, 2024

(87) PCT Pub. No.: WO2023/102988
PCT Pub. Date: Jun. 15, 2023

(65) Prior Publication Data
US 2024/0419036 A1   Dec. 19, 2024

(30) Foreign Application Priority Data
Dec. 9, 2021 (CN) .......................... 202111499690.6

(51) Int. Cl.
*G02F 1/1335* (2006.01)
*G02F 1/13357* (2006.01)
*H05K 7/20* (2006.01)

(52) U.S. Cl.
CPC .. *G02F 1/133628* (2021.01); *G02F 1/133603* (2013.01); *G02F 1/133608* (2013.01); *H05K 7/20963* (2013.01); *H05K 7/2099* (2013.01)

(58) Field of Classification Search
CPC ......... G02F 1/133628; G02F 1/133603; G02F 1/133608; H05K 7/20963; H05K 7/2099
See application file for complete search history.

(56) References Cited

U.S. PATENT DOCUMENTS

2018/0088368 A1* 3/2018 Notoshi ............... G02B 6/0085

FOREIGN PATENT DOCUMENTS

| CN | 102174905 | 9/2011 |
|----|-----------|--------|
| CN | 202253141 | 5/2012 |

OTHER PUBLICATIONS

International Search Report and the Written Opinion Dated Jul. 26, 2022 From the International Searching Authority Re. Application No. PCT/CN2021/138513 and Its Translation Into English. (15 Pages).

(Continued)

*Primary Examiner* — Elmito Breval (57) ABSTRACT

An embodiment of the present application discloses a backlight module and a display device. The backlight module device: a frame body, wherein the frame body includes at least one accommodation chamber; a backlight source disposed on a side of the accommodation chamber; and a heat dissipation enhancement layer disposed in the accommodation chamber, wherein heat dissipation enhancement layer including a liquid heat dissipation agent. The embodiment of the present application by the heat dissipation enhancement layer including the liquid heat dissipation agent, can accelerate heat dissipation to mitigate difficulty to heat dissipation due to high power consumption such that a range of environments of use of the backlight module is improved.

18 Claims, 3 Drawing Sheets

(56) References Cited

OTHER PUBLICATIONS

Notification of Office Action and Search Report Dated Aug. 3, 2022 From The State Intellectual Property Office of the People's Republic of China Re. Application No. 202111499690.6 and Its Translation Into English. (15 Pages).
Notification of Office Action and Search Report Dated Sep. 27, 2023 From The State Intellectual Property Office of the People's Republic of China Re. Application No. 202111499690.6 and Its Translation Into English. (13 Pages).

* cited by examiner

BACKLIGHT MODULE AND DISPLAY DEVICE

RELATED APPLICATIONS

This application is a National Phase of PCT Patent Application No. PCT/CN2021/138513 having International filing date of Dec. 15, 2021, which claims the benefit of priority of Chinese Patent Application No. 202111499690.6 filed on Dec. 9, 2021. The contents of the above applications are all incorporated by reference as if fully set forth herein in their entirety.

FIELD AND BACKGROUND OF THE INVENTION

The present application relates to a field of displays, especially to a backlight module and a display device.

With increase of display functions and application scenarios of a display device, heat dissipation of the display device becomes an increasingly importance factor for consideration. In a car carrying display device, car carrying display device has an increasing demand on brightness. No matter which is a general edge lit backlight source solution, a direct-lit backlight source solution, or a direct-lit mini light emitting diodes (Mini LED) backlight source solution, power consumption of the backlight module is getting higher. The following heat dissipation issue due to high power consumption becomes more an more obvious. High heat flux restricts a use environment of the backlight module and reduces reliability of the backlight module.

SUMMARY OF THE INVENTION

Technical Issue

An embodiment of the present application provides a backlight module and a display device that can solve an issue of difficulty to heat dissipation resulting from high power consumption and an issue that high heat flux restricts a use environment of a backlight module and results in lowered reliability of the backlight module.

Solution for the Issue

Technical Solution

An embodiment of the present application provides a backlight module, comprising:
- a frame body, comprising at least one accommodation chamber;
- a backlight source disposed on a side of the accommodation chamber, wherein the backlight source comprises a plurality of light emitting diodes arranged in an array; and
- a heat dissipation enhancement layer disposed in the accommodation chamber, wherein the heat dissipation enhancement layer comprises a liquid heat dissipation agent.

Optionally, in some embodiments of the present application, wherein the heat dissipation enhancement layer comprises a liquid absorption core, the liquid absorption core is a capillary or porous structure, and the liquid heat dissipation agent permeates the liquid absorption core.

Optionally, in some embodiments of the present application, wherein a material of the liquid absorption core comprises at least one of fiber mesh, copper powder particles, or foam copper.

Optionally, in some embodiments of the present application, wherein the liquid absorption core comprises at least one hollow chamber.

Optionally, in some embodiments of the present application, wherein the liquid absorption core comprises at least one aperture, the aperture is located on any side of the hollow chamber, and the aperture is sealed by a heat dissipation material.

Optionally, in some embodiments of the present application, wherein the frame body further comprises a disposing chamber and a backplate layer, the accommodation chamber and the disposing chamber are disposed parallelly at an interval, the backplate layer is connected between the accommodation chamber and the disposing chamber, and the backlight source is disposed in the disposing chamber.

Optionally, in some embodiments of the present application, wherein a side of the backplate layer facing the accommodation chamber comprises a heat dissipation fin, and the heat dissipation fin extends toward the liquid absorption core.

Optionally, in some embodiments of the present application, wherein the heat dissipation fin comprises a plurality of first protrusions disposed at intervals, and a first recess is disposed in adjacent two of the first protrusions.

Optionally, in some embodiments of the present application, wherein the liquid absorption core comprises a plurality of second recesses matching the heat dissipation fin.

Optionally, in some embodiments of the present application, wherein the frame body comprises a first frame disposed on at side end of the backlight module, the first frame and the backplate layer are an integrally formed structure, and the first frame constitutes a side portion inner wall of the accommodation chamber.

Optionally, in some embodiments of the present application, wherein the frame body further comprises a second frame disposed on the side end of the backlight module, the second frame and the backplate layer are an integrally formed structure, the second frame is located on a side of the backplate layer away from the first frame, the second frame surrounds the backlight source, and the second frame constitute a sidewall of the disposing chamber.

Optionally, in some embodiments of the present application, wherein the heat dissipation structure further comprises a heat conductive layer, the heat conductive layer is disposed on a side of the heat dissipation enhancement layer away from the backlight source, and the heat conductive layer constitutes a bottom portion inner wall of the accommodation chamber.

Optionally, in some embodiments of the present application, wherein a material of the liquid heat dissipation agent comprises at least one of ethanol, water, or acetone.

Accordingly, the embodiment of the present application also provides a display device, comprising a display panel and a backlight module, and the backlight module comprising:
- a frame body, comprising at least one accommodation chamber;
- a backlight source disposed on a side of the accommodation chamber, wherein the backlight source comprises a plurality of light emitting diodes arranged in an array; and
- a heat dissipation enhancement layer disposed in the accommodation chamber, wherein the heat dissipation enhancement layer comprises a liquid heat dissipation agent;

wherein the display panel is disposed on a side of the backlight source away from the heat dissipation enhancement layer.

Optionally, in some embodiments of the present application, wherein the heat dissipation enhancement layer comprises a liquid absorption core, the liquid absorption core is a capillary or porous structure, and the liquid heat dissipation agent permeates the liquid absorption core.

Optionally, in some embodiments of the present application, wherein a material of the liquid absorption core comprises at least one of fiber mesh, copper powder particles, or foam copper.

Optionally, in some embodiments of the present application, wherein the liquid absorption core comprises at least one hollow chamber.

Optionally, in some embodiments of the present application, wherein the frame body further comprises a disposing chamber and a backplate layer, the accommodation chamber and the disposing chamber are disposed parallelly at an interval, the backplate layer is connected between the accommodation chamber and the disposing chamber, and the backlight source is disposed in the disposing chamber.

Optionally, in some embodiments of the present application, wherein a side of the backplate layer facing the accommodation chamber comprises a heat dissipation fin, and the heat dissipation fin extends toward the liquid absorption core.

Optionally, in some embodiments of the present application, wherein the heat dissipation fin comprises a plurality of first protrusions disposed at intervals, and a first recess is disposed in adjacent two of the first protrusions.

ADVANTAGES OF INVENTION

Advantages

In the embodiment of the present application, provides a backlight module and a display device. The backlight module comprises a frame body. The frame body comprises at least one accommodation chamber. A heat dissipation enhancement layer is disposed in the accommodation chamber. The heat dissipation enhancement layer comprises a liquid heat dissipation agent. The heat dissipation agent, after heated, at least partially converts from the liquid state to the gas state to quickly absorb heat. The heat dissipation agent, after cooled, at least partially converts from the gas state to the liquid state such that the dissipation agent can be used repeatedly for heat dissipation. Disposing the heat dissipation agent of the heat dissipation enhancement layer can accelerate heat dissipation to mitigate difficulty to heat dissipation due to high power consumption such that a range of environments of use of the backlight module is improved and reliability of the backlight module are improved.

BRIEF DESCRIPTION OF THE SEVERAL VIEWS OF THE DRAWINGS

Description of Drawings

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DESCRIPTION OF SPECIFIC EMBODIMENTS OF THE INVENTION

Detailed Description of Invention

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application. In addition, it should be understood that the specific embodiments described here are only used to illustrate and explain the present application, and are not used to limit the present application. In the present application, the used orientation terminologies such as "upper" and "lower", when are not specified to the contrary explanation, usually refer to the upper and lower states of the device in actual use or working conditions, specifically according to the direction of the figures in the drawings. Furthermore, "inner" and "outer" refer to the outline of the device.

An embodiment of the present application provides a backlight module, comprising: a frame body, wherein the frame body comprises at least one accommodation chamber; a backlight source disposed on a side of the accommodation chamber, wherein backlight source comprises a plurality of light emitting diodes disposed in an array; a heat dissipation enhancement layer disposed in the accommodation chamber, wherein the heat dissipation enhancement layer comprises liquid heat dissipation agent.

The embodiment of the present application provides a backlight module and a display device described in detail respectively as follows. It should be explained that a description order of the following embodiments has no limit to a preferred order of the embodiments.

First Embodiment

Figure 1:
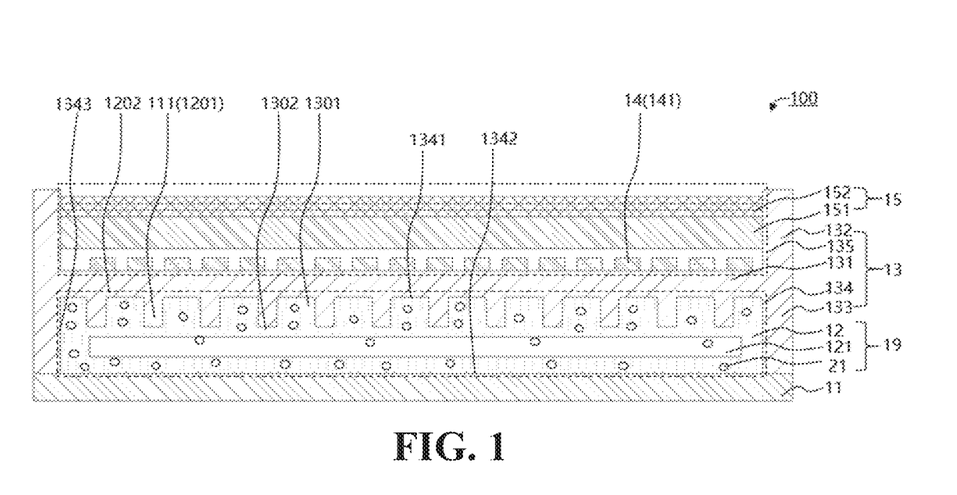
FIG. 1 is a schematic view of a first cross-sectional structure of a backlight module provided by an embodiment of the present application.
Figure 2:
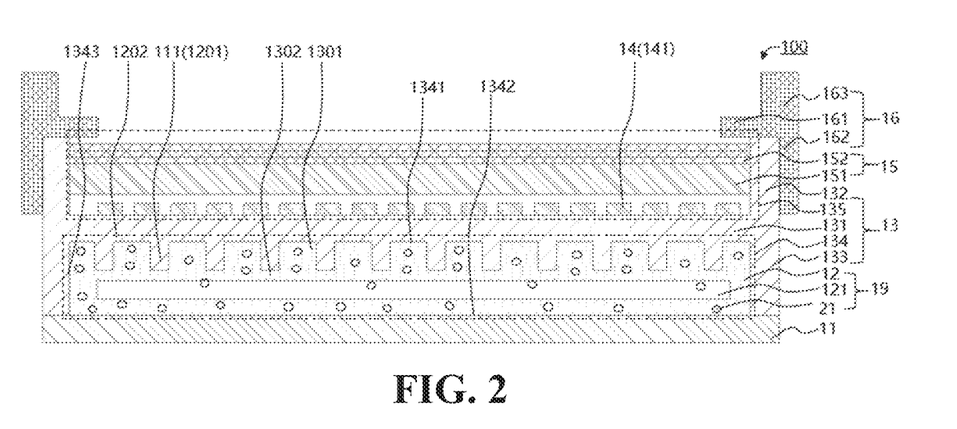
FIG. 2 is a schematic view of a second cross-sectional structure of the backlight module provided by an embodiment of the present application.
Figure 3:
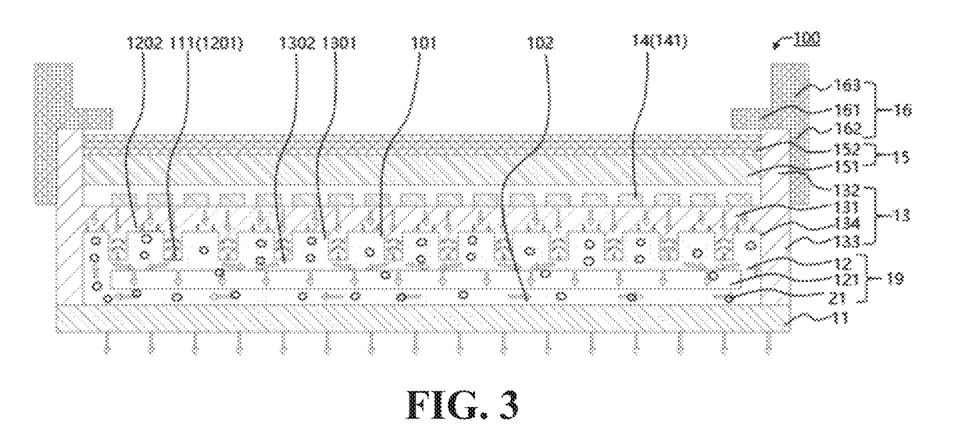
FIG. 3 is a schematic view of the backlight module provided by an embodiment of the present application during heat dissipation.

With reference to FIG. 1, FIG. 2, FIG. 3, FIG. 1 is a schematic view of a first cross-sectional structure of a backlight module 100 provided by an embodiment of the present application, FIG. 2 is a schematic view of a second cross-sectional structure of the backlight module 100 provided by an embodiment of the present application, FIG. 3 is a schematic view of the backlight module 100 provided by an embodiment of the present application during heat dissipation.

The embodiment of the present application provides a backlight module 100, the backlight module 100 comprises: a frame body 13, a backlight source 14, and a heat dissipation enhancement layer 19. The frame body 13 comprises at least one accommodation chamber 134. The backlight source 14 is disposed on a side of the accommodation chamber 134. The backlight source 14 comprises a plurality of light emitting diodes 141. The heat dissipation enhancement layer 19 is disposed in the accommodation chamber 134. The heat dissipation enhancement layer 19 has a liquid heat dissipation agent 21.

In particular, the backlight module 100 is a direct-lit backlight module. The backlight source 14 comprises the light emitting diodes 141 arranged in an array. The light emitting diodes 141 can be a common LED chip or mini/micro light emitting diodes (Mini/Micro LED), which is not limited here In particular, the heat dissipation enhancement layer 19 is disposed on a rear of the backlight source 14, namely, it is disposed on a side of a light exiting state of the backlight source 14 away from the backlight module 100.

In particular, the liquid heat dissipation agent 21, after heated, at least partially converts from a liquid state to a gas state. the liquid heat dissipation agent 21, after cooled, at least partially converts from the gas state to the liquid state.

In particular, the liquid heat dissipation agent 21, after heated, at least partially converts from the liquid state to the gas state to absorb heat. The liquid heat dissipation agent 21, after cooled, at least partially converts from the gas state to the liquid state. Therefore, the liquid heat dissipation agent 21 can be used repeated to enhance a heat dissipation effect.

In particular, for example, during operation of the backlight module 100, the backlight source 14 generate a great amount of heat. After absorbing heat generated from the backlight source 1, the liquid heat dissipation agent 21 at least partially converts from the liquid state to the gas state to absorb a great amount of heat to achieve the function of rapidly lowering a temperature of the backlight source.

In particular, for example, when the backlight module 100 does not operate, the liquid heat dissipation agent 21 is affected by a low temperature of an ambient environment or other components, the liquid heat dissipation agent 21 at least partially converts from the gas state to the liquid state. As such, the liquid heat dissipation agent 21 can be used repeatedly for acceleration of heat dissipation.

In particular, for example, when the backlight module 100 operates, the liquid heat dissipation agent 21 near the backlight source 14 converts from the liquid state to the gas state, and then the liquid heat dissipation agent 21 in the gas state conducts heat on a side away from the backlight source 14 to an ambient environment or other component. The liquid heat dissipation agent 21 in the gas state converts from the gas state to the liquid state such that a heat conduction channel rapidly conducting heat from the backlight source 14 to an ambient environment or other component is established to rapidly dissipate heat and quickly lower the temperature of the backlight source 14 or the backlight module 100. Also, the liquid heat dissipation agent 21 can repeatedly accelerate heat dissipation and cooling.

In some embodiments, the heat dissipation enhancement layer 19 comprises a liquid absorption core 12, the liquid absorption core 12 is a capillary or porous structure, the liquid heat dissipation agent 21 permeates the liquid absorption core 12.

In particular, the liquid absorption core 12 is a capillary or porous structure such that the liquid heat dissipation agent 21 can permeate the capillary or porous structure of the liquid absorption core 12.

In some embodiments, the liquid absorption core 12 comprises at least one hollow chamber 121.

In particular, the liquid absorption core 12 comprises at least one hollow chamber 121, the liquid absorption core 12 can comprise a plurality of small hollow chambers. Alternatively, the liquid absorption core 12 can comprise a plurality of entirely large hollow chambers, which is not limited here.

In some embodiments, the frame body 13 further comprises a disposing chamber 135 and a backplate layer 131. The accommodation chamber 134 and the disposing chamber 135 are parallel to each other and are disposed at an interval. The backplate layer 131 is connected between the accommodation chamber 134 and the disposing chamber 135. The backlight source 14 is disposed in the disposing chamber 135.

In particular, the frame body 13 comprises the backplate layer 131. The frame body 13 further comprises the accommodation chamber 134 and the disposing chamber 135. The accommodation chamber 134 and the disposing chamber 135 are disposed parallelly on two sides of the backplate layer 131 at an interval. The heat dissipation enhancement layer 19 is disposed in the accommodation chamber 134. The backlight source 14 is disposed in the disposing chamber 135.

In particular, the disposing chamber 135 is shown in a range of a broken line bracket as shown in FIGS. 1 and 2. A plurality of light emitting diodes 141 are disposed in the disposing chamber 135. In particular, a plurality of light emitting diodes 141 are disposed on a surface of a side of the backplate layer 131 facing the disposing chamber 135.

In particular, in some embodiments, the frame body 13 comprises a backplate layer 131. The backplate layer 131 constitutes a top portion inner wall 1341 of the accommodation chamber 134. The backlight source 14 is disposed on a side of the backplate layer 131 away from the accommodation chamber 134.

In particular, the accommodation chamber 134 is in a range of another broken line bracket as shown in FIGS. 1 and 2, a shape of the accommodation chamber 134 can match or be consistent with a shape of an outer surface of the liquid absorption core 12. The rectangular broken line bracket in the figures are only illustrative, and does not indicate necessity of a rectangle shape of the accommodation chamber 134.

In particular, the backlight source 14 can be directly disposed on the backplate layer 131. The backplate layer 131 is configured to carry the backlight source 14. Also, the backplate layer 131 constitutes a top portion inner wall 1341 of the accommodation chamber 134.

In some embodiments, a side of the backplate layer 131 facing the accommodation chamber 134 comprises a heat dissipation fin 111. The heat dissipation fin 111 extends toward the liquid absorption core 12.

In particular, the heat dissipation fin 111 is disposed on a surface of the backplate layer 131 facing a side of the accommodation chamber 134. Namely, the heat dissipation fin 111 is disposed on a surface of a top portion inner wall 1341 of the accommodation chamber 134.

In particular, the heat dissipation fin 111 can increase heat conduction area of heat conducted from the backlight source 14 to the heat dissipation enhancement layer 19 such that a channel area of heat conduction or heat exchange is increased to further improve a speed of heat dissipation and cooling.

In some embodiments, the heat dissipation fin 111 comprises a plurality of first protrusions 1201 disposed at intervals, and a first recess 1202 is disposed between adjacent two of the first protrusions 1201.

In particular, the heat dissipation fin 111 comprises a plurality of first protrusions 1201 disposed at intervals, or the first protrusions 1201 constitute a structure of the heat dissipation fin 111.

In some embodiments, the liquid absorption core 12 comprises a plurality of second recesses 1302 matching the heat dissipation fin 111.

In particular, the liquid absorption core 12 comprises a plurality of second recesses 1302 matching the heat dissipation fin 111 to increase a surface area of heat conducted from the backlight source 14 to the backplate layer 131 and heat conducted from the backplate layer 131 to the heat dissipation enhancement layer 19, namely, a channel of heat conduction is increased to facilitate rapid heat conduction and dissipation.

Further, in particular, the heat dissipation fin 111 comprises a plurality of first protrusions 1201. The first protrusions 1201 are disposed at intervals. A plurality of first recesses 1202 is formed among the first protrusions 1201. The liquid absorption core 12 comprises second recesses 1302 disposed corresponding to the first protrusions 1201. The second recesses 1302 are disposed at intervals. A plurality of second protrusions 1301 are formed among the second recesses 1302. The first protrusions 1201 correspond to or match the second recesses 1302. The first recesses 1202 correspond to or match the second protrusions 1301, which increases a channel area of heat conduction and facilitates rapid heat conduction and dissipation.

In some embodiments, the frame body 13 comprises a first frame 133 disposed on at side end of the backlight module 100. The first frame 133 and the backplate layer 131 is an integrally formed structure, the first frame 133 constitutes a side portion inner wall 1343 of the accommodation chamber 134.

In particular, the first frame 133 and the backplate layer 131 are the same material, and are finished by the same manufacturing process. The first frame 133 surrounds a side end of the accommodation chamber 134. The first frame 133 constitutes a side portion inner wall 1343 of the accommodation chamber 134 such that the frame body 13 has a simple structure, facilitates assembling the backlight module 100, and also make the accommodation chamber 134 have very excellent airtightness to prevent overflow of the heat dissipation agent 21.

In some embodiments, the frame body 13 further comprises a second frame 132 disposed on at side end of the backlight module 100. The second frame 132 and the backplate layer 131 are an integrally formed structure. The second frame 132 is located on a side of the backplate layer 131 away from the first frame 133. The second frame 132 surrounds the backlight source 14. The second frame 132 constitutes a sidewall of the disposing chamber 135.

In particular, the second frame 132 is located at an end portion of the backplate layer 131. The second frame 132 surrounds the backlight source 14 and provides the backlight source 14 with a disposing space to prevent the backlight source 14 from being damaged by an external force.

In particular, the first frame 133, the second frame 132, the backplate layer 131 are an integrally formed structure, these three are the same material and are finished by the same manufacturing process such that the frame body 13 has a simple structure to facilitate assembling the backlight module 100.

In some embodiments, heat dissipation structure further comprises the heat conductive layer 11, a heat conductive layer 11 is disposed on a side of the heat dissipation enhancement layer 19 away from the backlight source 14. The heat conductive layer 11 constitutes a bottom portion inner wall 1342 of the accommodation chamber 134.

In particular, the heat conductive layer 11 is disposed on a side of the heat dissipation enhancement layer 19 away from the backlight source 14. The heat conductive layer 11 constitutes a bottom portion inner wall 1342 of the accommodation chamber 134, not only performs a function of sealing the accommodation chamber 134, but also performs a function of dissipating heat of the backlight module 100 or the heat dissipation agent 21 to an ambient environment.

In particular, with reference to FIG. 3, an arrow of FIG. 3 indicate a heat conduction path. The backlight module 100 comprises an evaporation end 101 and a condensing end 102. The evaporation end 101 is a nearby portion of the liquid absorption core 12 contacting the top portion inner wall 1341. The condensing end 102 is a nearby portion of the liquid absorption core 12 contacting the bottom portion inner wall 1342. At the evaporation end 101, the heat dissipation agent 21 absorbs heat conducted from the backlight source 14, and converts from the liquid state to the gas state to absorb a great amount of heat. At the condensing end 102, the heat dissipation agent 21 conducts heat to the heat conductive layer 11. The heat conductive layer 11 conducts heat to an ambient environment or other component. The heat dissipation agent 21 dissipates a great amount of heat. The heat dissipation agent 21 converts from the gas state to the liquid state. As such, heat dissipation agent converts between the liquid state and the gas state to achieve a function of rapidly dissipating and conducting heat such that the heat dissipation agent 21 is repeatedly used to fast heat dissipation and can accelerate heat dissipation to mitigate difficulty to heat dissipation due to high power consumption, improve a range of use environment of the backlight module 100, and raise reliability of the backlight module. For example the backlight module 100 can be used in a scenario of a higher environmental temperature.

In particular, furthermore, because the liquid absorption core 12 is porous capillary, capillary action of the liquid absorption core 12 re-conducts the liquid heat dissipation agent 21 from the condensing end 102 to the evaporation end 101. Such the heat dissipation agent 21 repeatedly in the liquid state absorbs a great amount of heat and evaporate at the evaporation end 101*s*. The heat dissipation agent 21 in the gas state, under a differential pressure effect, flows to the condensing end 102 and is condensed to the liquid state. The heat dissipation agent 21 in the liquid state at the condensing end 102, under the capillary pressure action, returns to the evaporation end 101 to perform operation circulation to be able to accelerate heat dissipation to mitigate difficulty to heat dissipation due to high power consumption, such that a range of use environment of the backlight module 100 and reliability of the backlight module are improved, For example the backlight module 100 can be used in a scenario of a higher environmental temperature.

The embodiment of the present application, the backlight module 100 comprises a frame body 13. The frame body 13 comprises at least one accommodation chamber 134. A heat dissipation enhancement layer 19 is disposed in the accommodation chamber 134. The heat dissipation enhancement layer 19 comprises a liquid heat dissipation agent 21. The heat dissipation agent 21, after heated, at least partially converts from the liquid state to the gas state to rapidly absorb heat. The heat dissipation agent 21, after cooled, at least partially converts from the gas state to the liquid state such that the heat dissipation agent 21 can be used repeatedly for heat dissipation. a configuration of the heat dissipation agent 21 of the heat dissipation enhancement layer 19 can accelerate heat dissipation to mitigate difficulty to heat dissipation due to high power consumption to improve a range of use environment of the backlight module 100 and raise reliability of the backlight module 100.

Second Embodiment

The present embodiment is the same as or similar to the above embodiment, and a difference is that a structure and material of each part of the backlight module 100 are introduced.

In some embodiments, a material of the liquid heat dissipation agent 21 comprises at least one of ethanol, water, or acetone.

In particular, a material of the liquid heat dissipation agent 21 comprises at least one of ethanol, water, or acetone. The liquid heat dissipation agent 21, by employing these materials, can achieve conversion between the liquid state and the gas state at a lower temperature. For example, in a temperature range of 20° C. to 100° C., the liquid heat dissipation agent 21, after absorbing heat, can convert from the liquid state to the gas state and can rapidly absorb a great amount of heat.

In some embodiments, a material of the liquid absorption core 12 comprises at least one of fiber mesh, copper powder particles, or foam copper.

In particular, to achieve the liquid absorption core 12 being a capillary or porous shape, a material of the liquid absorption core 12 comprises at least one of fiber mesh, copper powder particles, or foam copper. The liquid absorption core 12 manufactured by these materials can be a capillary or porous shape.

In some embodiments, a material of the backplate layer 131 comprises at least one of aluminum, copper, iron.

In particular, the backplate layer 131 not only carries the backlight source 14, but also perform a function of conducting heat from the backlight source 14 to the heat dissipation enhancement layer 19. Therefore, the backplate layer 131 requires to use a material of excellent heat conduction, for example, the material of at least one of aluminum, copper, iron.

In particular, the frame body 13 comprises a backplate layer 131 and a first frame 133 and a second frame 132 disposed on at side end of an outside of the backplate layer 131. The first frame 133 and the second frame 132 are disposed on two sides of an end portion of the backplate layer 131. The first frame 133 surrounds a side end of the backlight source 14. The first frame 133 can perform a function of protecting the backlight source 14. Also, the first frame 133 can conduct heat of the backlight source 14 form the side end of the backlight module 100 to an ambient environment. The second frame 132 surrounds a side end of the liquid absorption core 12. The second frame 132 can conduct heat of the liquid absorption core 12 from the side end of the backlight module 100 to an ambient environment.

In particular, a material the frame body 13 comprises at least one of aluminum, copper, or iron. The frame body 13 not only performs a function securing an entire frame of the backlight module 100 but also perform a function of heat conduction and dissipation.

In some embodiments, the backlight module 100 further comprises an optical film complex layer 15 and a sealant frame 16. The optical film complex layer 15 is disposed on a side of the backlight source 14 away from the heat dissipation enhancement layer 19. The sealant frame 16 surrounds a side end of the frame body 13.

In particular, in some embodiments, with reference to FIGS. 1 and 2, the backlight module 100 further comprises an optical film complex layer 15 disposed on a side of the backlight source 14 away from the heat dissipation enhancement layer 19. The optical film complex layer 15 is multi-layered optical film lamination layer. The optical film complex layer 15 performs a function of evening and adjusting light emitted from the backlight source 14. For example, the optical film complex layer 15 comprises a light guide plate 151 disposed on the backlight source 14 and a multi-film layer 152 disposed on a side of the light guide plate 151 away from the backlight source 14. The multi-film layer 152 can comprise prism lens, a diffuser, etc., which is not described repeatedly here.

In particular, in some embodiments, with reference to FIGS. 2 and 3, the backlight module 100 can further comprise a sealant frame 16, the sealant frame 16 comprises a first extension portion 161, a second extension portion 162, and a third extension portion 163. The second extension portion 162 and the third extension portion 163 are disposed two sides of a side end of the first extension portion 161 respectively, the first extension portion 161 is perpendicular to or substantially perpendicular to the second extension portion 162 and the third extension portion 163. The first extension portion 161 is disposed on the optical film complex layer 15 and is configured to carry a display panel 17 of a later embodiment. The second extension portion 162 is configured to engage the sealant frame 16 securely with the frame body 13. The third extension portion 163 is configured to protect the display panel 17 of the later embodiment.

Third Embodiment

The embodiment of the present application is the same or similar to the above embodiment, and a difference is that it further describe a structure or manufacturing method of the heat dissipation enhancement layer 19 in detail.

Figure 4:
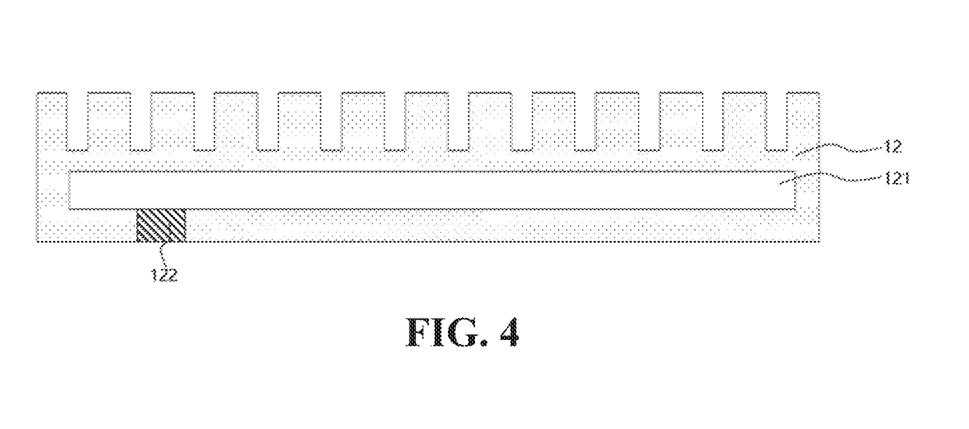
FIG. 4 is a schematic view of a cross-sectional structure of a heat dissipation enhancement layer provided by an embodiment of the present application.

With reference to FIG. 4, FIG. 4 is a schematic view of a cross-sectional structure of the liquid absorption core 12 provided by an embodiment of the present application.

In some embodiments, the liquid absorption core 12 comprises at least one aperture 122, the aperture 122 is located on any side of the hollow chamber 121, and the aperture 122 is sealed by a heat dissipation material.

In particular, the aperture 122 is located on any side of the hollow chamber 121. The liquid absorption core 12 comprises one or at least one aperture 122, the aperture 122 is configured to immerse the hollow chamber 121 with a heat dissipation agent 21. The aperture 122 sealed by the heat dissipation material is for preventing the heat dissipation agent 21 from overflowing out through the hollow chamber 121. Also, the heat dissipation material can dissipate and conduct heat.

In particular, a method for manufacturing the heat dissipation enhancement layer 19 can comprise: providing a liquid absorption core 12 comprising a hollow chamber 121 and an aperture 122; immersing the liquid absorption core 12 fully in the heat dissipation agent 21 and then placing the liquid absorption core 12 into the accommodation chamber 134; and sealing the aperture 122 by a heat dissipation material.

In particular, a heat dissipation material such as aluminum, copper, iron, etc. can be used to seal the aperture 122 by soldering or adhering.

In the present embodiment, the aperture 122 is located on any side of the hollow chamber 121. The aperture 122 is sealed by heat dissipation material, and a material sealing the aperture 122 can have an excellent thermal conductive performance, which can increase a heat dissipation performance of the heat dissipation enhancement layer 19.

Fourth Embodiment

Figure 5:
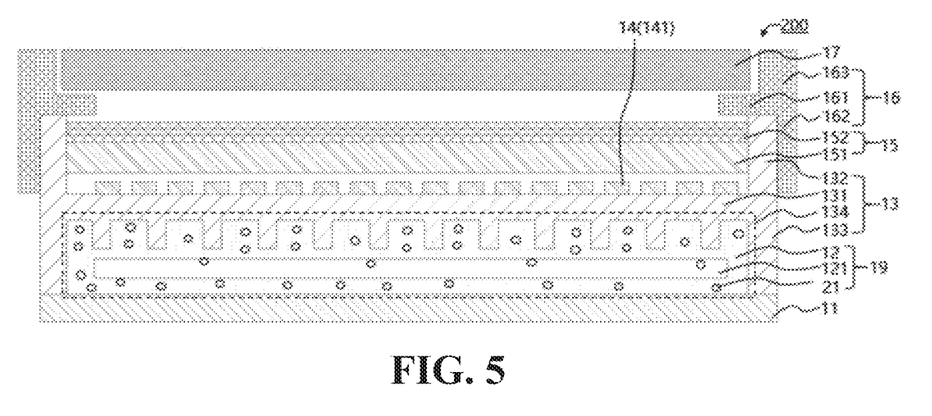
FIG. 5 is a schematic view of the display device provided by an embodiment of the present application.

With reference to FIG. 5, FIG. 5 is a schematic view of the display device 200 provided by an embodiment of the present application.

the embodiment of the present application provides a display device 200. The display device 200 comprises a display panel 17 and the backlight module 100 as any one described above. the display panel 17 is disposed on a side of the backlight source 14 away from the heat dissipation enhancement layer 19.

In particular, the display panel 17 is disposed on a side of the optical film complex layer 15 away from the backlight source 14.

In particular, the display panel 17 can be a liquid crystal display panel.

The backlight module and the display device provided by the embodiment of the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. A backlight module, comprising:
   a frame body, comprising at least one accommodation chamber;
   a backlight source disposed on a side of the accommodation chamber, wherein the backlight source comprises a plurality of light emitting diodes arranged in an array; and
   a heat dissipation enhancement layer disposed in the accommodation chamber, wherein the heat dissipation enhancement layer comprises a liquid heat dissipation agent;
   wherein the heat dissipation enhancement layer comprises a liquid absorption core, the liquid absorption core is a capillary or porous structure, and the liquid heat dissipation agent permeates the liquid absorption core.

2. The backlight module according to claim 1, wherein a material of the liquid absorption core comprises at least one of fiber mesh, copper powder particles, or foam copper.

3. The backlight module according to claim 1, wherein the liquid absorption core comprises at least one hollow chamber.

4. The backlight module according to claim 3, wherein the liquid absorption core comprises at least one aperture, the aperture is located on any side of the hollow chamber, and the aperture is sealed by a heat dissipation material.

5. The backlight module according to claim 1, wherein the frame body further comprises a disposing chamber and a backplate layer, the accommodation chamber and the disposing chamber are disposed parallelly at an interval, the backplate layer is connected between the accommodation chamber and the disposing chamber, and the backlight source is disposed in the disposing chamber.

6. The backlight module according to claim 5, wherein a side of the backplate layer facing the accommodation chamber comprises a heat dissipation fin, and the heat dissipation fin extends toward the liquid absorption core.

7. The backlight module according to claim 6, wherein the heat dissipation fin comprises a plurality of first protrusions disposed at intervals, and a first recess is disposed in adjacent two of the first protrusions.

8. The backlight module according to claim 6, wherein the liquid absorption core comprises a plurality of second recesses matching the heat dissipation fin.

9. The backlight module according to claim 5, wherein the frame body comprises a first frame disposed on at side end of the backlight module, the first frame and the backplate layer are an integrally formed structure, and the first frame constitutes a side portion inner wall of the accommodation chamber.

10. The backlight module according to claim 9, wherein the frame body further comprises a second frame disposed on the side end of the backlight module, the second frame and the backplate layer are an integrally formed structure, the second frame is located on a side of the backplate layer away from the first frame, the second frame surrounds the backlight source, and the second frame constitute a sidewall of the disposing chamber.

11. The backlight module according to claim 9, wherein the heat dissipation structure further comprises a heat conductive layer, the heat conductive layer is disposed on a side of the heat dissipation enhancement layer away from the backlight source, and the heat conductive layer constitutes a bottom portion inner wall of the accommodation chamber.

12. The backlight module according to claim 1, wherein a material of the liquid heat dissipation agent comprises at least one of ethanol, water, or acetone.

13. A display device, comprising a display panel and a backlight module, and the backlight module comprising:
   a frame body, comprising at least one accommodation chamber;
   a backlight source disposed on a side of the accommodation chamber, wherein the backlight source comprises a plurality of light emitting diodes arranged in an array; and
   a heat dissipation enhancement layer disposed in the accommodation chamber, wherein the heat dissipation enhancement layer comprises a liquid heat dissipation agent;
   wherein the display panel is disposed on a side of the backlight source away from the heat dissipation enhancement layer;
   wherein the heat dissipation enhancement layer comprises a liquid absorption core, the liquid absorption core is a capillary or porous structure, and the liquid heat dissipation agent permeates the liquid absorption core.

14. The display device according to claim 13, wherein a material of the liquid absorption core comprises at least one of fiber mesh, copper powder particles, or foam copper.

15. The display device according to claim 13, wherein the liquid absorption core comprises at least one hollow chamber.

16. The display device according to claim 13, wherein the frame body further comprises a disposing chamber and a backplate layer, the accommodation chamber and the disposing chamber are disposed parallelly at an interval, the backplate layer is connected between the accommodation chamber and the disposing chamber, and the backlight source is disposed in the disposing chamber.

17. The display device according to claim 16, wherein a side of the backplate layer facing the accommodation chamber comprises a heat dissipation fin, and the heat dissipation fin extends toward the liquid absorption core.

18. The display device according to claim 17, wherein the heat dissipation fin comprises a plurality of first protrusions disposed at intervals, and a first recess is disposed in adjacent two of the first protrusions.

* * * * *